United States Patent [19]
Majid et al.

[11] Patent Number: 5,995,384
[45] Date of Patent: *Nov. 30, 1999

[54] FUNCTIONAL ON/OFF SWITCH FOR SWITCHED-MODE POWER SUPPLY CIRCUIT WITH BURST MODE OPERATION

[75] Inventors: Naveed Majid, Mohegan Lake, N.Y.; Tom M.G. Mobers, Grave; Erwin G.R. Seinen, Malden, both of Netherlands

[73] Assignee: Philips Electronics North America Corporation, New York, N.Y.

[*] Notice: This patent is subject to a terminal disclaimer.

[21] Appl. No.: 08/903,774

[22] Filed: Jul. 31, 1997

[51] Int. Cl.$^6$ .................................................. H02M 3/337
[52] U.S. Cl. .............................. 363/21; 363/56; 323/902; 348/730
[58] Field of Search .................................. 363/21, 49, 56; 323/902; 307/109, 110; 315/411; 348/730

[56] References Cited

U.S. PATENT DOCUMENTS

| 4,688,159 | 8/1987 | Marinus | 363/21 |
| 5,812,383 | 9/1998 | Majid et al. | 363/21 |

OTHER PUBLICATIONS

"Mixed Frequency Mode Green PWM Controller", No. MC44603, Motorola Semiconductor Technical Data, pp. 1–30, Feb. 28, 1995.

*Primary Examiner*—Peter S. Wong
*Assistant Examiner*—Derek J. Jardieu
*Attorney, Agent, or Firm*—Edward W. Goodman

[57] ABSTRACT

A switched-mode power supply circuit having an operating mode and a stand-by mode, includes a functional ON/OFF switch. The switched-mode power supply circuit includes a transformer and a controllable switch connected to a primary winding of the transformer for switchably connecting the primary winding to a source of d.c. voltage. In the stand-by mode, based on a detected voltage level at an input of a controller IC, the switched-mode power supply circuit is arranged to switchable connect the primary winding to the d.c. voltage source in bursts which occur at a low frequency. By switchably connecting this input to a power source for the switched-mode power supply circuit, the controller IC detects the absence of this power source, and turns off the switched-mode power supply circuit allowing a minimum current consumption by the switched-mode power supply circuit.

24 Claims, 4 Drawing Sheets

FUNCTIONAL ON/OFF SWITCH FOR SWITCHED-MODE POWER SUPPLY CIRCUIT WITH BURST MODE OPERATION

BACKGROUND OF THE INVENTION

1. Field of the Invention

The subject invention relates to switched-mode power supply circuits for television receivers.

2. Description of the Related Art

Switched-mode power supply circuits are used in television receivers to provide main operating power and stand-by power to the various circuit in the television receiver. A particular type of switched-mode power supply circuit provides stand-by power using a burst mode of operation. Although power consumption during this stand-by burst mode is low, there is still an appreciable amount of power being consumed. Thus, the television receiver also includes a main power switch for terminating all power to the television receiver when a user anticipates that the television receiver will not be used for a significant period of time.

This main power switch is usually in the form of a mechanical switch which is bulky and expensive.

SUMMARY OF THE INVENTION

It is an object of the present invention to provide a functional ON/OFF switch for a switched-mode power supply circuit in a television receiver, which is low-cost and small in size, and which is capable of very low power consumption during an OFF state.

The above object is achieved with a switched-mode power supply circuit having an operating mode and a stand-by mode, said switched-mode power supply circuit comprising means for generating a d.c. supply voltage having a first output terminal and a second output terminal; a transformer having a primary winding, an auxiliary primary winding, a first secondary winding and a second secondary winding, said primary winding having a first terminal coupled to the first output terminal of said generating means, and a second terminal; a controllable switch connected in a series with the second terminal of said primary winding and the second output terminal of said generating means; a main output capacitor coupled across output terminals of said first secondary winding for providing a first main output voltage in the operating state and a second main output voltage in the stand-by mode, said second main output voltage being lower than said first main output voltage; a control output capacitor coupled across output terminals of said second secondary winding for providing a control output voltage; means for selectively coupling one of the output terminals of said first secondary winding to said second secondary winding during said stand-by mode; an opto-coupler having light emitting means and light detecting means optically coupled to said light emitting means; means for selectively coupling the light emitting means of said opto-coupler across said control output capacitor during said stand-by mode; means for causing said light emitting means to emit light to said light detecting means when the control output voltage across said control output capacitor exceed a predetermined value during said stand-by mode; a controller having an output for supplying switching signals to said controllable switch, an auxiliary voltage sensing input coupled, via a shunting auxiliary capacitor, to said auxiliary primary winding of said transformer, and a stand-by mode detecting input coupled to an output of said light detecting means, said light detecting means having an input coupled to receive said auxiliary voltage, said controller comprising a start-up current source for charging said auxiliary capacitor during start-up of said switched-mode power supply, whereby, during said stand-by mode, said stand-by current source is used to intermittently charge the auxiliary capacitor when said controllable switch is not switching; and means for selectively coupling said stand-by mode detecting input of said controller to said first output terminal of said generating means, wherein said controller further comprises means for turning off said start-up current source and means for stopping said switching signals, thereby turning off said switched-mode power supply circuit, when said first output terminal is not coupled to said stand-by mode detecting input.

In the above switched-mode power supply circuit, when the OFF mode is desired, the coupling of the first output terminal of the generating means to the stand-by mode detecting input of the controller is removed. The drop in voltage at the stand-by mode detecting input is detected by the turning off means which, in response, turns off the start-up current source and activates the means for stopping the switching signals. This then effectively turns off the switched-mode power supply circuit, in that it now only consumes approximately 300 $\mu$A of current.

Applicants have found that when replacing the main mechanical switch with the functional ON/OFF switch of the subject invention, it is necessary to ensure that the switched-mode power supply circuit consumes a minimum amount of power, e.g., 15 watts, even in the event of faults.

To that end, the switched-mode power supply circuit as described above, is characterized in that the controller further comprises means for limiting power consumption when said coupling means selectively uncouples the first output terminal of said generating means from said stand-by detecting input of said controller.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
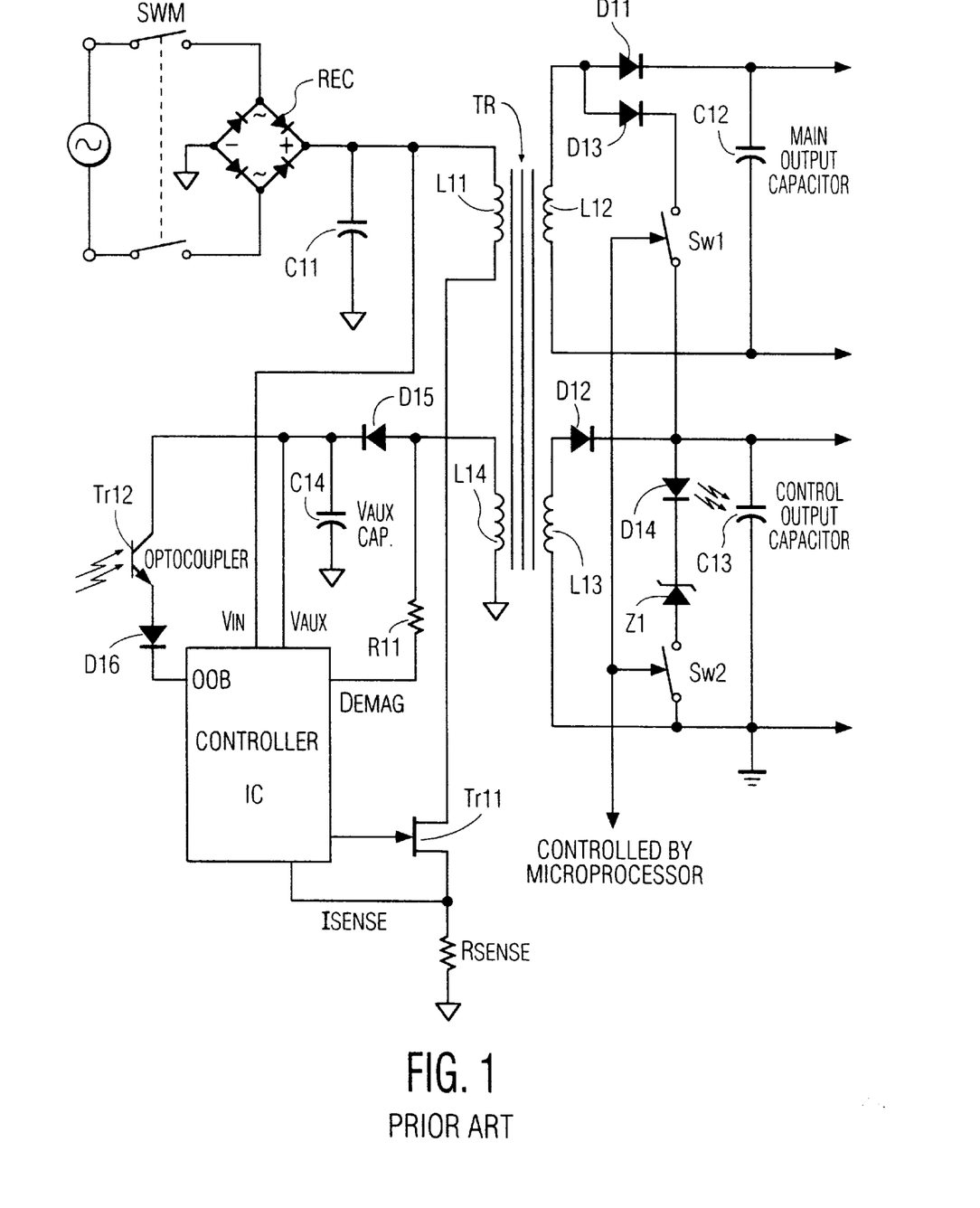
FIG. 1 shows a schematic diagram of a prior art switched-mode power supply circuit having a mechanical ON/OFF switch.

FIG. 1 shows a schematic block diagram of a known switched-mode power supply using primary control. In particular, a diode rectifier bridge REC is connected to a line voltage source through a master switch SWM. An output from the rectifier bridge REC is connected to ground through a capacitor C11 and to one end of a primary winding L11 of a transformer TR. The other end of primary winding L11 is connected to one terminal of a controllable switch Tr11, the other terminal of which being connected to ground through a sense resistor $R_{SENSE}$. A first secondary winding L12 of the transformer TR has a first end and a second end connected to each other through a series arrangement of a diode D11 and a main output capacitor C12, the second end of the first secondary winding L12 also being connected to ground. A load (not shown) may be connected across the main output capacitor C12.

The transformer TR also includes a second secondary winding L13 having a first end and a second end connected to each other through a series arrangement of a diode D12 and a control output capacitor C13, the second end of the second secondary winding L13 also being connected to ground. A microprocessor (not shown), for controlling, for example, a television receiver in which the switched-mode power supply circuit is installed, is connected across the control output capacitor C13 to receive operating power.

The first end of the first secondary winding L12 is also connected, via a diode D13 and a controllable switch Sw1, to one end of the control output capacitor C13, while the control output capacitor C13 is shunted by a series arrangement of a light emitting diode D14 of an opto-coupler, a Zener diode Z1 and a controllable switch Sw2. The controllable switches Sw1 and Sw2 are controlled by a signal from the microprocessor to initiate the stand-by mode of the switched-mode power supply circuit.

The transformer TR further includes an auxiliary primary winding L14 which has one end connected to a diode D15, and then to ground through a $V_{AUX}$ capacitor C14, to a $V_{AUX}$ input of a controller IC, and to one terminal of a light sensor Tr12 of the opto-coupler, the other terminal of the light sensor Tr12 being connected to a stand-by mode detecting input (OOB) of the controller IC. The other end of the auxiliary primary winding L14 is connected to ground. The controller IC also has a $V_{IN}$ input connected to the output of the rectifier bridge REC, a DEMAG input connected through a resistor R11 to the one end of the auxiliary primary winding L14, a driver output connected to the control input of controllable switch Tr11, and an $I_{SENSE}$ input connected to the resistor $R_{SENSE}$.

In order to turn off the switched-mode power supply circuit, one merely activated the switch SWM which cut off power to the rectifier bridge REC. However, this type of switch is costly and bulky due to the amount of power that it must handle.

Figure 2:
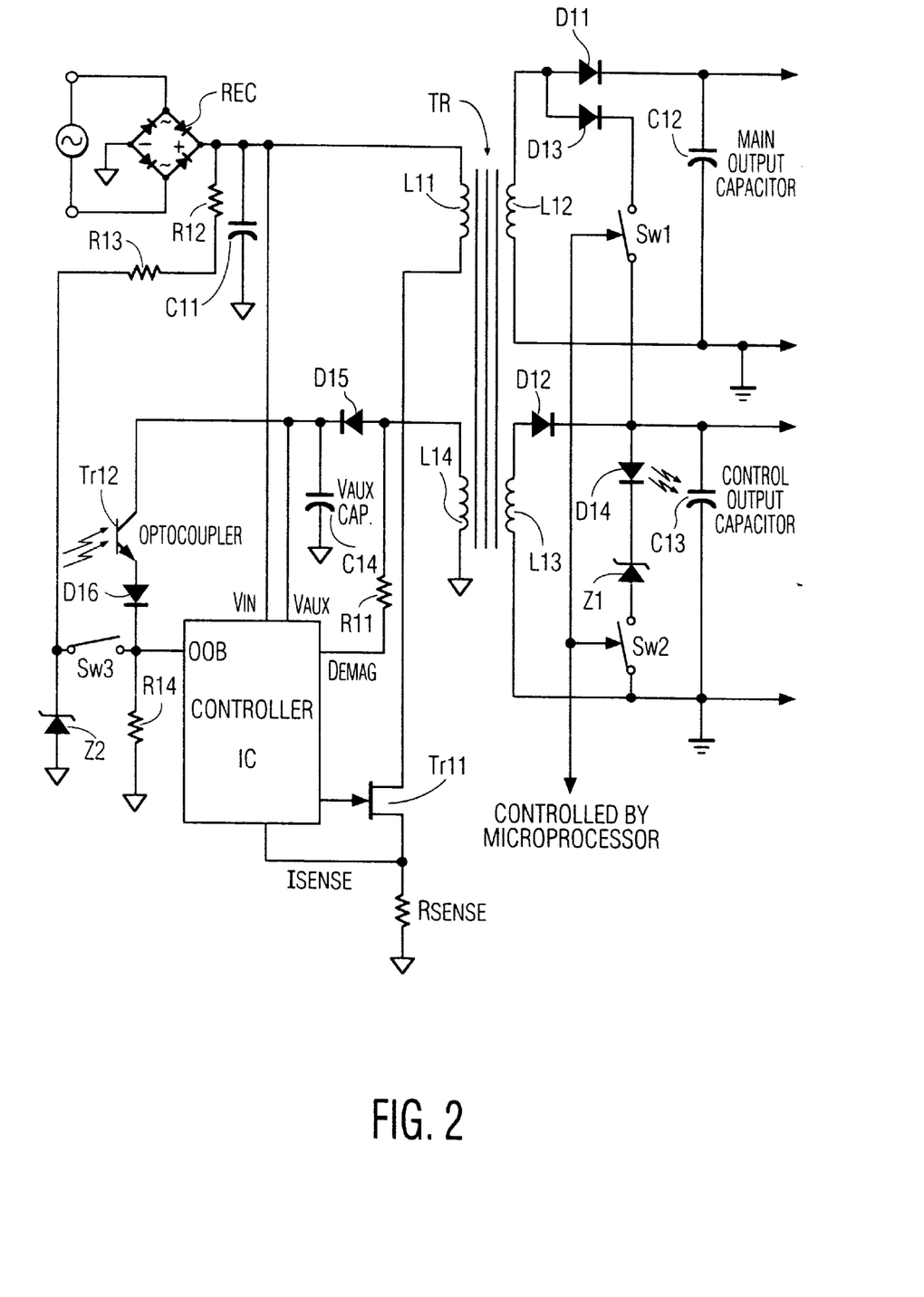
FIG. 2 shows a schematic block diagram of a first embodiment of a switched-mode power supply circuit according to the subject invention.

FIG. 2 shows the switched-mode power supply circuit of FIG. 1 in which the subject invention has been incorporated. In particular, the series arrangement of two resistors R12 and R13 and a Zener diode Z2 is connected between the first output terminal of the rectifier bridge REC and ground. The junction between the Zener diode Z2 and resistor R13 is connected to the OOB input of the controller IC via a switch Sw3, which is further connected to ground via a resistor R14.

When it is desired to turn off the switched-mode power supply circuit, switch Sw3 is opened, removing the voltage across the Zener diode Z2 from the OOB input of the controller IC. The controller IC detects this drop in the voltage on the OOB input and stops the controllable switch Tr11 from switching. In this state, the controller IC draws less than 300 $\mu$A thereby effecting the OFF state.

Figure 3:
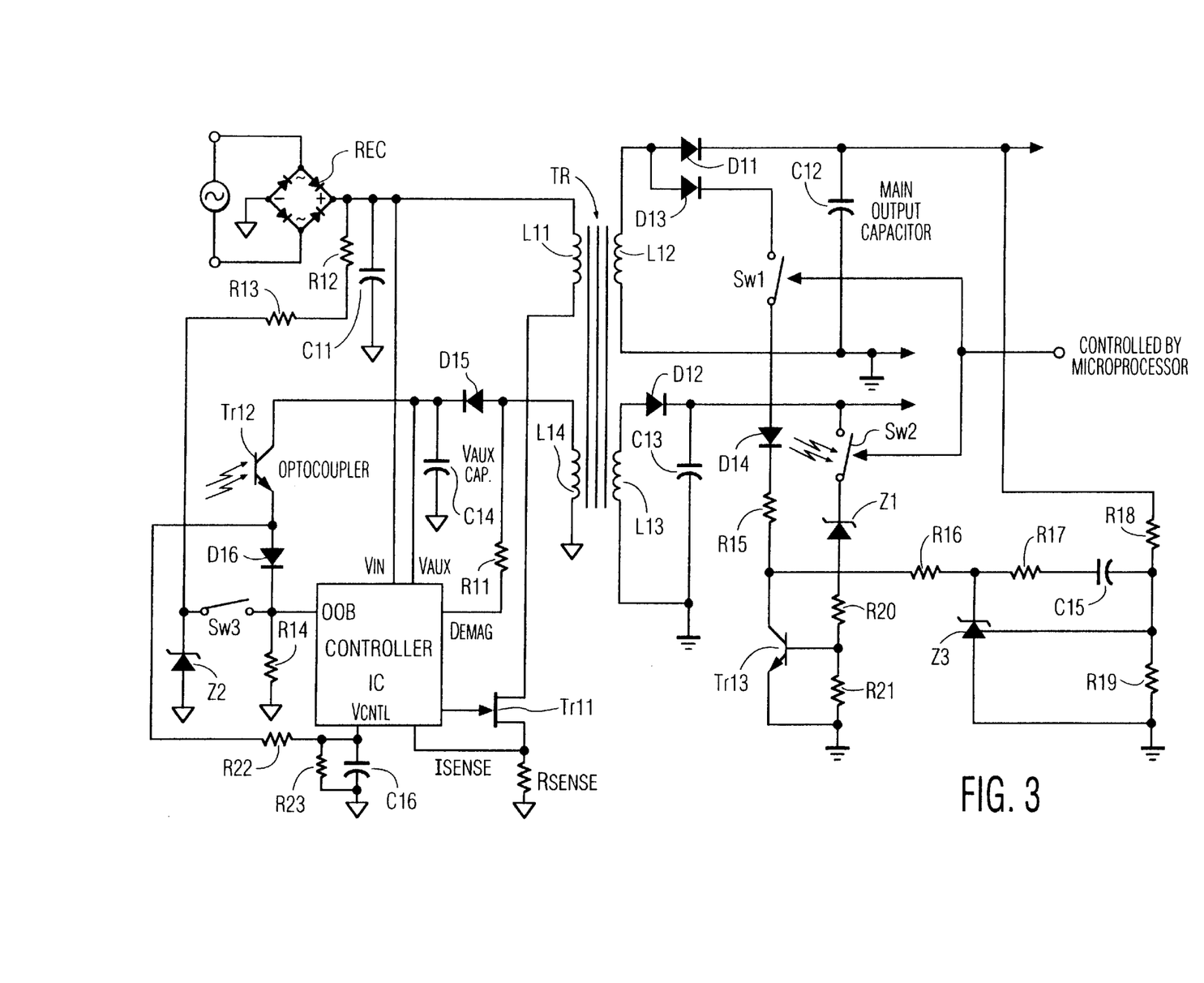
FIG. 3 shows a schematic block diagram of a second embodiment of a switched-mode power supply circuit according to the subject invention.

The embodiment shown in FIG. 2 uses a separate opto-coupler in primary sensing to signal the controller IC that burst mode stand-by is desired. However, in most switched-mode power supplies, an opto-coupler is already being used to regulate the control voltage during normal operation. FIG. 3 shows a second embodiment of the switched-mode power supply circuit of the subject invention in which the already existing opto-coupler is additionally used in secondary sensing to signal burst mode standby operation. In particular, the light emitting diode D14 of the opto-coupler is connected through resistors R15 and R16 to the anode of a Zener diode Z3, the cathode of which being connected to ground. A series combination of a resistor R17 and a capacitor C15 connects the anode of the Zener diode Z3 to a control terminal of the Zener diode Z3 and to junction point between resistors R18 and R19 connected between the output of the first secondary winding L12 and ground. Switch Sw2 connects the anode of Zener diode Z1 to the output of the second secondary winding L13, the cathode of Zener diode Z1 being connected to ground through the series arrangement of resistors R20 and R21. The junction between resistors R15 and R16 is connected to the collector of an NPN transistor Tr13, having an emitter connected to ground and a base connected to the junction between resistors R20 and R21. On the primary side, the junction between the light sensor Tr12 of the opto-coupler and the diode D16 is further connected through a resistor R22 to a $V_{CNTL}$ input of the controller IC which is also connected to ground through the parallel arrangement of a resistor R23 and a capacitor C16.

During normal operation, transistor Tr13 is off and the intensity of the light being emitted by the light emitting diode D14 of the opto-coupler is controlled by the circuit R16–R19, C15 and Z3. This variable light intensity causes a corresponding response in the light sensor Tr12 which applies a portion of the $V_{AUX}$ voltage to the $V_{CNTL}$ input of the controller IC for regulating the duty cycle of the controllable switch TR11, which is beyond the scope of the present invention and will not be described further. However, when the microprocessor signals burst mode stand-by operation by closing switches Sw1 and Sw2, due to the increased control output voltage across the control output capacitor, transistor Tr13 turns on fully causing the light emitting diode D14 to emit a much increased light output, which, in turn, causes the light sensor Tr12 to apply the whole of the $V_{AUX}$ voltage to the OOB input of the controller IC.

Figure 4:
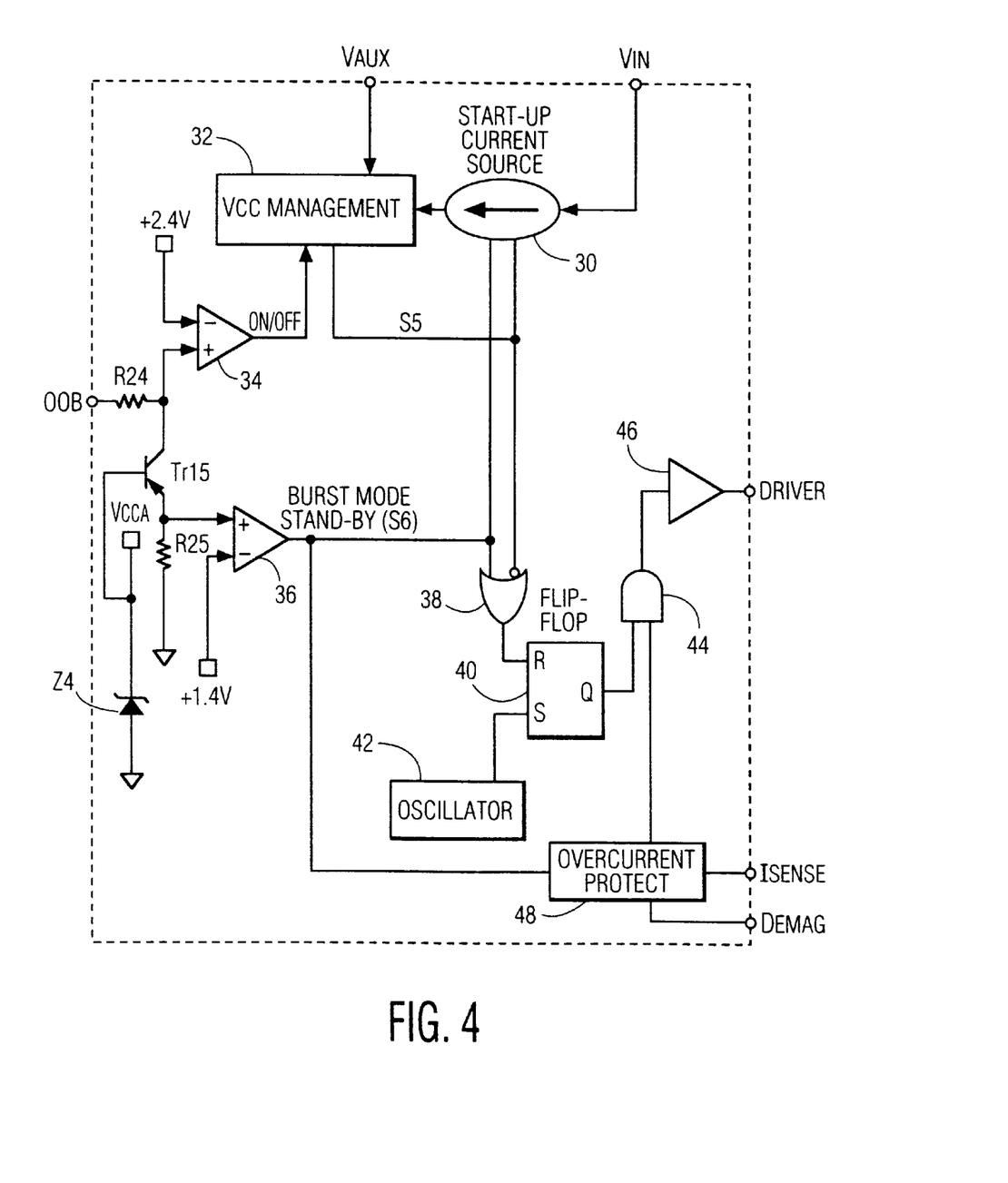
FIG. 4 shows a block diagram of the start-up current source and Vcc management circuit as well as the over-current protection circuit contained in the controller.

As shown in FIG. 4, the controller IC includes a start-up current source 30 coupled to the $V_{IN}$ input and a Vcc management circuit 32 connected to the $V_{AUX}$ input. The OOB input is connected to a resistor R24 and then to a first comparator 34 for comparing the voltage thereon to +2.4V, and generating an "OFF/ON" signal. This OFF/ON signal is applied to an input of the Vcc management circuit 32. The resistor R24 is also connected to the collector of an NPN transistor Tr15. The base of transistor Tr15 is connected to a voltage source Vcca, and to ground via a Zener diode Z4. The emitter of the transistor Tr14 is connected to a second comparator 36 for comparing the voltage thereon to +1.4V, for generating a "Burst Mode Stand-by" signal S6. This signal S6 is applied to the start-up current source 30 and to one input of an OR-gate 38. An output (S5) from the Vcc management circuit 32 is also applied to the start-up current source 30 and to an inverting input of OR-gate 38. An output from OR-gate 38 is applied to the reset input of an RS flip-flop 40, the set input being connected to an output of an oscillator 42. The Q output from the RS flip-flop 40 is connected to one input of an AND-gate 44 which has an output connected to a driver 46 for driving the controllable switch Tr11.

The operation of the switched-mode power supply circuit will now be described. When line voltage is applied to the rectifier bridge REC, with switch Sw3 open, the controller IC is in a "sleep mode" and the current consumption is less than 300 μA. Once switch Sw3 is closed, the voltage on the OOB input is then equal to the Zener diode Z2 voltage (i.e., higher than +2.4V) causing the output from the OFF/ON comparator 34 to go "high". This commences a start-up sequence and Vcc management circuit 32 turns off the S5 signal causing the start-up current source 30 to generate a current I1 for charging the $V_{AUX}$ capacitor C14. Once the $V_{AUX}$ voltage rises above a predetermined level, the Vcc management circuit 32 turns on the signal S5 and the controller IC (at $t_2<t<t_4$) now starts causing the controllable switch Tr11 to switch which then causes the transformer TR to start transferring energy from the primary winding. L11 to the secondary windings L12 and L13, and also to the auxiliary primary winding L14 which then takes over supplying the $V_{AUX}$ capacitor C14. The switched-mode power supply circuit is now in normal operation.

When burst mode stand-by operation is desired, the microprocessor closes switches Sw1 and Sw2 thereby coupling the first secondary winding L12 to the second secondary winding L13 thereby removing energy from the main output capacitor C12. In addition, switch Sw2 connects the light emitting diode D14 of the opto-coupler and the Zener diode Z1 across the second secondary winding L13. The coupling of the first and second secondary windings L12 and L13 now causes an increase in the control output voltage across the control output capacitor C13. When the control output voltage exceeds the Zener diode Z1 voltage, the light emitting diode D14 is energized. This causes the light sensor Tr12 to couple the $V_{AUX}$ voltage to the OOB input of the controller IC. Since the $V_{AUX}$ voltage is in excess of, for example, +5.6V, the comparator 36 generates the signal S6 resetting the flip-flop 40 which stops the controllable switch Tr11 from switching.

Once the controllable switch Tr11 stops switching, transformer TR ceases transferring energy form the primary winding L11 to the first and second secondary windings L12 and L13 and to the auxiliary primary winding L14. As a result, the control output capacitor C13 and the $V_{AUX}$ capacitor C14 begin to drain causing the control voltage and the $V_{AUX}$ voltage to begin to drop. When the control voltage drops below the Zener diode Z1 voltage, the light emitting diode D14 stops emitting light, the light sensor Tr12 removes the $V_{AUX}$ voltage from input OOB of the controller IC, and the comparator 36 stops generating the signal S6. The $V_{AUX}$ voltage has been dropping during this time and when the $V_{AUX}$ voltage has dropped to an under-voltage $V_{UVLO}$ level, the Vcc management circuit 32 stops generating the signal S5 thereby maintaining the reset condition of the flip-flop 40, and activating the start-up current source 30 for charging up the $V_{AUX}$ capacitor C14 thereby raising the $V_{AUX}$ voltage. Once the $V_{AUX}$ voltage is at a start-up voltage $V_{START}$ level, the Vcc management circuit 32 generates the S5 signal which turns off the start-up current source 30 and allows the controllable switch Tr11 to commence switching. The switching of the controllable switch Tr11 allows the transformer TR to transfer energy from the primary winding L11 to the first and second secondary windings L12 and L13 and to the auxiliary primary winding L14. This cycle then repeats itself until the microprocessor opens switches Sw1 and Sw2 indicating an end to the burst mode stand-by operation and a return to normal operation.

When using the functional switch Sw3, it is important that the power consumption of the switched-mode power supply circuit be kept to a minimum level, e.g., 15 watts, even in the event of a fault. The circuit of resistors R14, R24 and R25, and transistor Tr15 provide this protection. In particular, when switch Sw3 is open, resistor R14 ensures that the voltage at the OOB input is close to ground. The first comparator 34 then senses an OFF state and the controller IC goes into a "sleep" mode where it does not start the switched-mode power supply circuit.

Burst mode is initiated by the light sensor Tr12 of the opto-coupler. When activated, the light sensor Tr12 forces a voltage greater than +5.6V at the OOB input and at the same time, provides a current large enough to force a voltage greater than the reference voltage, i.e., +1.4V, of the second comparator 36 on the resistor R25. The output of second comparator 36 then goes high and causes the switched-mode power supply circuit to go into burst mode stand-by operation.

Resistor R24 is chosen based on a fault condition where the input OOB is shorted to the $V_{AUX}$ input. In such a situation, the system should then go into burst mode operation thereby keeping the dissipation in the switched-mode power supply circuit below 15W. To this end, R24 acts as a current limiter. Transistor Tr13 is chosen to be a bipolar NPN transistor, instead of a PMOS type transistor, because of the high threshold voltage of a PMOS transistor (2.1V). Due to this higher threshold voltage, the burst mode trip level would be raised. The higher trip level would then make it impossible to put the switched-mode power supply into burst mode stand-by operation when a fault occurred.

When there is a short circuit between the OOB input and the $V_{AUX}$ input, the voltage $V_{AUX}$ is applied to the OOB input causing the second comparator 36 to detect burst mode stand-by operation. The controllable switch Tr11 is turned off and the Vcc management circuit 32 monitors the $V_{AUX}$ voltage. Due to the short circuit, the $V_{AUX}$ voltage gets clamped at a voltage level $V_{CLAMP}$, where:

$V_{CLAMP} = V_{CCA} + 0.6 + (I_{start} * R24)$

The voltage $V_{CLAMP}$ has a dependence on the value of R24, $I_{START}$ from the start-up current source 30, and temperature. Depending on the value of $V_{CLAMP}$, the $V_{AUX}$ voltage can get clamped at a voltage which is lower than the start-up voltage for the controller IC. In such a state, the controller IC "hangs" and never initiates a start-up. If $V_{CLAMP}$ is higher than the start-up voltage, the controller IC starts up and immediately senses a burst mode condition.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A switched-mode power supply circuit having an operating mode and a stand-by mode, said switched-mode power supply circuit comprising:

means for generating a d.c. supply voltage having a first output terminal and a second output terminal;

a transformer having a primary winding, an auxiliary primary winding, a first secondary winding and a second secondary winding, said primary winding having a first terminal coupled to the first output terminal of said generating means, and a second terminal;

a controllable switch connected in a series with the second terminal of said primary winding and the second output terminal of said generating means;

a main output capacitor coupled across output terminals of said first secondary winding for providing a first main output voltage in the operating state and a second main output voltage in the stand-by mode, said second main output voltage being lower than said first main output voltage;

a control output capacitor coupled across output terminals of said second secondary winding for providing a control output voltage;

means for selectively coupling one of the output terminals of said first secondary winding to said second secondary winding during said stand-by mode;

an opto-coupler having light emitting means and light detecting means optically coupled to said light emitting means;

means for selectively coupling the light emitting means of said opto-coupler across said control output capacitor during said stand-by mode;

means for causing said light emitting means to emit light to said light detecting means when the control output voltage across said control output capacitor exceeds a predetermined value during said stand-by mode;

a controller having an output for supplying switching signals to said controllable switch, an auxiliary voltage sensing input coupled, via a shunting auxiliary capacitor, to said auxiliary primary winding of said transformer, and a stand-by mode detecting input coupled to an output of said light detecting means, said light detecting means having an input coupled to receive said auxiliary voltage, said controller comprising a start-up current source for charging said auxiliary capacitor during start-up of said switched-mode power supply, whereby, during said stand-by mode, said stand-by current source is used to intermittently charge the auxiliary capacitor when said controllable switch is not switching; and means for selectively coupling said stand-by mode detecting input of said controller to said first output terminal of said generating means, wherein said controller further comprises means for turning off said start-up current source and means for stopping said switching signals, thereby turning off said switched-mode power supply circuit, when said first output terminal is not coupled to said stand-by mode detecting input.

2. A switched-mode power supply circuit as claimed in claim 1, characterized in that in said controller, said turning off means comprises a comparator having a first input coupled to said standby mode detecting input, a second input coupled to receive a predetermined voltage, and an output coupled to a control input of said start-up current source and to said means for stopping said switching signals, whereby when a voltage on said stand-by mode detecting input drops below said predetermined voltage indicating that said first output terminal is not coupled to said stand-by mode detecting input, said comparator turns off said start-up current means and causes the stopping means to stop the generation of said switching signals.

3. A switched-mode power supply circuit as claimed in claim 2, characterized in that said controller further comprises means for limiting power consumption when said coupling means selectively uncouples the first output terminal of said generating means from said stand-by detecting input of said controller.

4. A switched-mode power supply circuit as claimed in claim 3, wherein said controller comprises a further comparator having a first input coupled to the stand-by mode detecting input of said controller, a second input coupled to receive a further predetermined voltage, and an output coupled to a further control input of said start-up current source and to said means for stopping the supply of switching signals to said controllable switch, whereby when said voltage on said stand-by mode detecting input exceeds a threshold voltage by said light detecting means conducting said auxiliary voltage to said stand-by mode detecting input, said further comparator institutes stand-by burst mode operation by causing said stopping means to turn off said switching signals and said start-up current source to charge the auxiliary capacitor, characterized in that said power consumption limiting means comprises a resistor connected between said stand-by mode detecting input and the first input of said comparator; and an NPN transistor having a collector connected to the first input of said comparator, an emitter connected to the first input of said further comparator which is also connected to ground via a further resistor, and a base connected to a voltage source and to ground via a Zener diode, whereby said resistor acts as a current limiter and said NPN transistor ensures that said further comparator puts said switched-mode power supply circuit into standby burst mode when a voltage higher than said threshold voltage is applied to the stand-by mode detecting input of said controller.

5. A switched-mode power supply circuit as claimed in claim 1, characterized in that said switched-mode power supply circuit further comprises means for limiting a voltage on said stand-by mode detecting input of said controller when said first output terminal of said generating means is coupled to said stand-by mode detecting input of said controller.

6. A switched-mode power supply circuit as claimed in claim 5, characterized in that said limiting means comprises a series arrangement of a resistance and a Zener diode connected between said first output terminal of said generating means and ground, said coupling means selectively coupling a junction between said resistance and said Zener diode to said stand-by mode detecting input of said controller.

7. A switched-mode power supply circuit as claimed in claim 5, characterized in that said switched-mode power supply circuit further comprises means for draining a voltage on said stand-by mode detecting input of said controller when said stand-by mode detecting input is not coupled to said first output terminal of said generating means.

8. A switched-mode power supply circuit as claimed in claim 7, characterized in that said draining means comprises a resistance coupling said stand-by mode detecting input to ground.

9. A switched-mode power supply circuit having an operating mode and a stand-by mode, said switched-mode power supply circuit comprising:

means for generating a d.c. supply voltage having a first output terminal and a second output terminal;

a transformer having a primary winding, an auxiliary primary winding, a first secondary winding and a second secondary winding, said primary winding having a first terminal coupled to the first output terminal of said generating means, and a second terminal;

a controllable switch connected in a series with the second terminal of said primary winding and the second output terminal of said generating means;

a main output capacitor coupled across output terminals of said first secondary winding for providing a first main output voltage in the operating state and a second main output voltage in the stand-by mode, said second main output voltage being lower than said first main output voltage;

a control output capacitor coupled across output terminals of said second secondary winding for providing a control output voltage;

means for regulating the control output voltage, said regulating means comprising light emitting means coupled to said control output capacitor for receiving said control output voltage, and light detecting means optically coupled to said light emitting means, said light emitting means emitting a variable light output depending on a value of said control output voltage;

means for selectively coupling one of the output terminals of said first secondary winding to said second secondary winding during said stand-by mode;

means for causing said light emitting means to emit a maximum amount of light to said light detecting means when the control output voltage across said control output capacitor exceeds a predetermined value during said stand-by mode;

a controller having an output for supplying switching signals to said controllable switch, an auxiliary voltage sensing input coupled, via a shunting auxiliary capacitor, to said auxiliary primary winding of said transformer, a control voltage input coupled to an output of said light detecting means for receiving a variable control voltage corresponding to a variable light output from said light emitting means, and a stand-by mode detecting input also coupled to the output of said light detecting means for detecting when said light detecting means is detecting a maximum light output from said light sensing means, said light detecting means having an input coupled to receive said auxiliary voltage, said controller comprising a start-up current source for charging said auxiliary capacitor during start-up of said switched-mode power supply, whereby, during said stand-by mode, said standby current source is used to intermittently charge the auxiliary capacitor when said controllable switch is not switching; and means for selectively coupling said stand-by mode detecting input of said controller to said first output terminal of said generating means, wherein said controller further comprises means for turning off said start-up current source and means for stopping said switching signals, thereby turning off said switched-mode power supply circuit, when said first output terminal is not coupled to said stand-by mode detecting input.

10. A switched-mode power supply circuit as claimed in claim 9, characterized in that in said controller, said turning off means comprises a comparator having a first input coupled to said standby mode detecting input, a second input coupled to receive a predetermined voltage, and an output coupled to a control input of said start-up current source and to said means for stopping said switching signals, whereby when a voltage on said stand-by mode detecting input drops below said predetermined voltage indicating that said first output terminal is not coupled to said stand-by mode detecting input, said comparator turns off said start-up current means and causes the stopping means to stop the generation of said switching signals.

11. A switched-mode power supply circuit as claimed in claim 10, characterized in that said controller further comprises means for limiting power consumption when said coupling means selectively uncouples the first output terminal of said generating means from said stand-by detecting input of said controller.

12. A switched-mode power supply circuit as claimed in claim 11, wherein said controller comprises a further comparator having a first input coupled to the stand-by mode detecting input of said controller, a second input coupled to receive a further predetermined voltage, and an output coupled to a further control input of said start-up current source and to said means for stopping the supply of switching signals to said controllable switch, whereby when said voltage on said stand-by mode detecting input exceeds a threshold voltage by said light detecting means conducting said auxiliary voltage to said stand-by mode detecting input, said further comparator institutes stand-by burst mode operation by causing said stopping means to turn off said switching signals and said start-up current source to charge the auxiliary capacitor, characterized in that said power consumption limiting means comprises a resistor connected between said stand-by mode detecting input and the first input of said comparator; and an NPN transistor having a collector connected to the first input of said comparator, an emitter connected to the first input of said further comparator which is also connected to ground via a further resistor, and a base connected to a Vcca voltage source and to ground via a Zener diode, whereby said resistor acts as a current limiter and said NPN transistor ensures that said further comparator puts said switched-mode power supply circuit into standby burst mode when a voltage higher than said threshold voltage is applied to the stand-by mode detecting input of said controller.

13. A switched-mode power supply circuit as claimed in claim 9, characterized in that said switched-mode power supply circuit further comprises means for limiting a voltage on said stand-by mode detecting input of said controller when said first output terminal of said generating means is coupled to said stand-by mode detecting input of said controller.

14. A switched-mode power supply circuit as claimed in claim 13, characterized in that said limiting means comprises a series arrangement of a resistance and a Zener diode connected between said first output terminal of said generating means and ground, said coupling means selectively coupling a junction between said resistance and said Zener diode to said stand-by mode detecting input of said controller.

15. A switched-mode power supply circuit as claimed in claim 13, characterized in that said switched-mode power supply circuit further comprises means for draining a voltage on said stand-by mode detecting input of said controller when said stand-by mode detecting input is not coupled to said first output terminal of said generating means.

16. A switched-mode power supply circuit as claimed in claim 15, characterized in that said draining means comprises a resistance coupling said stand-by mode detecting input to ground.

17. A switched-mode power supply circuit having an operating mode and a stand-by mode, said switched-mode power supply circuit comprising:

means for generating a d.c. supply voltage having a first output terminal and a second output terminal;

a transformer having a primary winding, an auxiliary primary winding, and a secondary winding, said primary winding having a first terminal coupled to the first output terminal of said supply voltage generating means, and a second terminal, said secondary winding providing a first output voltage in the operating mode and a second output voltage in the stand-by mode, said second output voltage being lower than said first output voltage;

a controllable switch connected in a series with the second terminal of said primary winding and the second output terminal of said supply voltage generating means;

means coupled to said secondary winding for initiating said stand-by mode;

a controller having an output for supplying switching signals to said controllable switch, an auxiliary voltage sensing input coupled, via a shunting auxiliary capacitor, to said auxiliary primary winding of said transformer, and a stand-by mode detecting input coupled to an output of said stand-by mode initiating means, said controller causing said controllable switch to intermittently switch in bursts during said stand-by mode, said controller comprising a start-up current source for charging said auxiliary capacitor during start-up of said switched-mode power supply, whereby, during said stand-by mode, said start-up current source is used to intermittently charge the auxiliary capacitor when said controllable switch is not switching; and means for selectively coupling said stand-by mode detecting input of said controller to said first output terminal of said supply voltage generating means, wherein said controller further comprises means for turning off said start-up current source and means for stopping said switching signals, thereby turning off said switched-mode power supply circuit, when said first output terminal is not coupled to said stand-by mode detecting input.

18. A switched-mode power supply circuit as claimed in claim 17, characterized in that in said controller, said turning off means comprises a comparator having a first input coupled to said stand-by mode detecting input, a second input coupled to receive a predetermined voltage, and an output coupled to a control input of said start-up current source and to said means for stopping said switching signals, whereby when a voltage on said stand-by mode detecting input drops below said predetermined voltage indicating that said first output terminal is not coupled to said stand-by mode detecting input, said comparator turns off said start-up current means and causes the stopping means to stop the generation of said switching signals.

19. A switched-mode power supply circuit as claimed in claim 17, characterized in that said switched-mode power supply circuit further comprises means for limiting a voltage on said stand-by mode detecting input of said controller when said first output terminal of said supply voltage generating means is coupled to said stand-by mode detecting input of said controller.

20. A switched-mode power supply circuit as claimed in claim 19, characterized in that said limiting means comprises a series arrangement of a resistance and a Zener diode connected between said first output terminal of said supply voltage generating means and ground, said coupling means selectively coupling a junction between said resistance and said Zener diode to said stand-by mode detecting input of said controller.

21. A switched-mode power supply circuit as claimed in claim 19, characterized in that said switched-mode power supply circuit further comprises means for draining a voltage on said stand-by mode detecting input of said controller when said stand-by mode detecting input is not coupled to said first output terminal of said generating means.

22. A switched-mode power supply circuit as claimed in claim 21, characterized in that said draining means comprises a resistance coupling said stand-by mode detecting input to ground.

23. A switched-mode power supply circuit as claimed in claim 18, characterized in that said controller further comprises means for limiting power consumption when said coupling means selectively uncouples the first output terminal of said supply voltage generating means from said stand-by detecting input of said controller.

24. A switched-mode power supply circuit as claimed in claim 23, wherein said controller comprises a further comparator having a first input coupled to the stand-by mode detecting input of said controller, a second input coupled to receive a further predetermined voltage, and an output coupled to a further control input of said start-up current source and to said means for stopping the supply of switching signals to said controllable switch, whereby when said voltage on said stand-by mode detecting input from said stand-by mode initiating means exceeds a threshold voltage, said further comparator institutes stand-by burst mode operation by causing said stopping means to turn off said switching signals and said start-up current source to charge the auxiliary capacitor, characterized in that said power consumption limiting means comprises a resistor connected between said stand-by mode detecting input and the first input of said comparator; and an NPN transistor having a collector connected to the first input of said comparator, an emitter connected to the first input of said further comparator which is also connected to ground via a further resistor, and a base connected to a voltage source and to ground via a Zener diode, whereby said resistor acts as a current limiter and said NPN transistor ensures that said further comparator puts said switched-mode power supply circuit into stand-by burst mode when a voltage higher than said threshold voltage is applied to the stand-by mode detecting input of said controller.

* * * * *